United States Patent [19]

Dickinson et al.

[11] 4,222,118

[45] Sep. 9, 1980

[54] INTELLIGENT AUTOMATIC GAIN CONTROL CIRCUIT

[75] Inventors: John D. Dickinson, El Cajon; Philip L. Writer, San Diego, both of Calif.

[73] Assignee: The United States of America as represented by the Secretary of the Navy, Washington, D.C.

[21] Appl. No.: 929,371

[22] Filed: Jul. 31, 1978

[51] Int. Cl.$^3$ ............................................ H04B 7/005
[52] U.S. Cl. ..................................... 455/70; 364/514; 455/247
[58] Field of Search .................. 325/51, 52, 56, 62, 325/65, 400, 404, 411, 408, 67; 364/514, 200 MS File, 900 MS File; 333/17; 343/175–177

[56] References Cited

PUBLICATIONS

"Power Level Control in TDMA Satellite Communication System"–M. L. Shulman, W. D. Torrey; IBM Technical Disclosure Bulletin, vol. 19, No. 3, pp. 1005–1006, Aug. 1976.

*Primary Examiner*—Marc E. Bookbinder

[57] ABSTRACT

A method and apparatus for controlling the gain of receivers in a computer-to-computer communications network using intelligence in the signal to control the receiver gain. Each of the computers in the communications network has associated therewith a transmitter and a receiver for transmitting and receiving data from one or more of the other computers in the system. Preferably, each such receiver has associated therewith an automatic gain control circuit which operates automatically to increase the gain when low level signals are received and to decrease the gain when high level signals are received. At least one of the receivers and preferably each receiver in the system has associated therewith a memory device for storing compiled data indicative of the anticipated signal level from every other transmitter in the system. Means are provided for setting the level of gain in the receiver that is expected to receive a signal to the level expected to be required for proper reception of a signal transmitted by the transmitter next expected to send in accordance with the information stored in the memory device.

10 Claims, 4 Drawing Figures

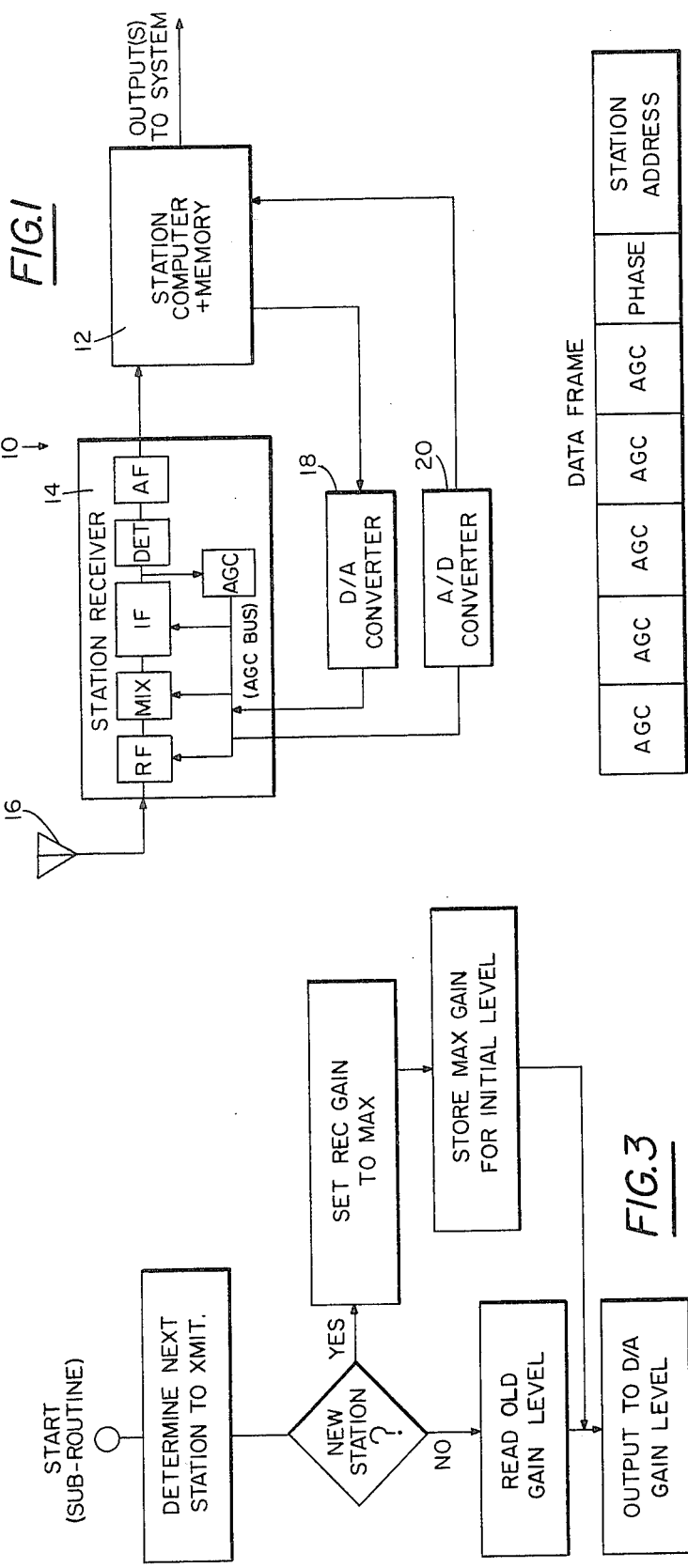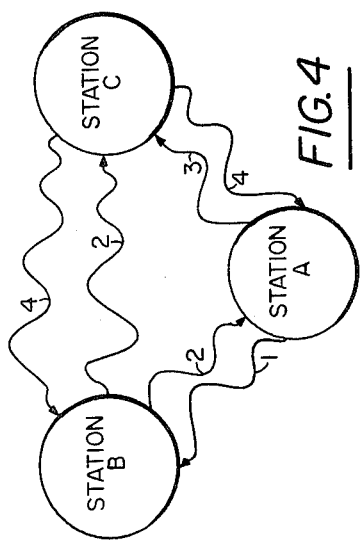

INTELLIGENT AUTOMATIC GAIN CONTROL CIRCUIT

BACKGROUND OF THE INVENTION

The present invention is related generally to systems employing at least two computers at remote locations from each other which have provision for the interchange of data between the system computers. More specifically, the present invention is related to those computer-to-computer systems in which an address message precedes the actual data message. This address contains information advising all receiving stations which station will transmit next.

Present communications network receivers use signal amplitude to control the receiver gain. The slow response time causes loss of data when a weak signal follows a strong signal and when a strong signal follows a weak signal. This situation arises, for instance, where one station, e.g. a ship, is nearby and is transmitting a signal that is of sufficient amplitude to saturate the receiver and another station, e.g. another ship, that is at a relatively distant location and is transmitting a signal that is of minimal amplitude at the receiver. The receiver, of course, in this situation must be fast enough to accommodate both the weak and the strong signal. In a Navy computer-to-computer communication system known as Link-14, this problem of accommodating reception of both weak and strong signals has been perfunctorily remedied by including in the actual message format a dead time known as automatic gain control (AGC) settling time. This settling time is illustrated schematically in FIG. 2 which illustrates the present Link-14 data frame format of using five AGC frames followed by three intelligence frames. As is readily apparent from FIG. 2, if a long message is transmitted then the AGC settling time becomes a small percentage of the total message. Most of the time, however, long messages are not sent and only the header, short message is transmitted. In that case the AGC settling time becomes almost half of the message. Obviously then great increases in the data rate can be achieved by eliminating this AGC settling time.

SUMMARY OF THE INVENTION

The present invention relates to a technique and apparatus relevant to systems such as the U.S. Navy Link-11 and Link-14 computer-to-computer systems and to any other computer-to-computer communications system in which a station address message precedes the actual message. The fact that the station address message contains information advising all receiving stations in the network which station will transmit next is utilized in accordance with the present invention to preset the AGC voltage in the receiver to that level that is compatible with the amplitude of the last signal that was transmitted from the aforesaid next station to transmit.

In accordance with the teachings of the present invention means are provided, preferably at each station in the network, for entering into and reading out of a continually updated memory signal level and gain level information, respectively. The updated memory is thereby available for readout of the strength of the signal that was previously received from the next transmitter to transmit. This readout is then used to adjust the AGC circuits of the receiving stations. It is readily apparent, therefore, that by utilization of the technique disclosed herein the receiving stations will undergo smaller and less time consuming excursions in the setting of the AGC circuits thereof. The natural consequences of this technique are the prevention of loss of data and the increase of system throughput. A priori information is thus used to determine which network station will transmit next and how strong the signal from that station was the last time that station transmitted. Further, in accordance with the present invention, to account for the situation where the next station to transmit has never transmitted before, the memory at the receiving stations may be preprogrammed to set an arbitrary AGC voltage level for reception from such transmitter. When that transmitting station comes on, each receiving station will have a stored value in memory for commensurately adjusting its own AGC circuit.

STATEMENT OF THE OBJECTS

Accordingly, it is the primary object of the present invention to teach the use of signal intelligence to control receiver gain in order to prevent loss of data and to increase system throughput.

A concomitant object of the present invention is the disclosure of a technique and apparatus for setting receiver gain to the best estimated level prior to reception.

Another object of the present invention is the disclosure of a technique for preventing the loss of data when a communication network experiences weak signals followed by strong signals.

Other objects, advantages and novel features of the invention will become apparent from the following detailed description of the invention when considered in conjunction with the accompanying drawings.

BRIEF DESCRIPTION OF THE DRAWINGS

FIG. 1 is a network block diagram of a preferred embodiment of the present invention. Since all stations in the system network can have an identical implementation to that illustrated in FIG. 1, only one such station is illustrated.

FIG. 2 is a schematic diagram of a prior art data frame format as previously described.

FIG. 3 is a flow-chart diagram of the computer software sub-routine suitable for implementation in the present invention.

FIG. 4 is a schematic diagram of a three-station network suitable for incorporation of the present invention.

DESCRIPTION OF THE PREFERRED EMBODIMENT

Referring first to FIG. 4 there is illustrated a prior art computer-to-computer link comprised of three remote stations, station A, station B, and station C. As is well known, each station comprises a computer and associated transmitting and receiving apparatus. A typical communication sequence, by way of example, might be as follows: (1) station A poles station B, (2) station B transmits to stations A and C, (3) station A poles station C, (4) station C transmits to stations A and B. In prior art systems such as the Navy's Link-14, events 1 and 3 in FIG. 4 include the transmission of the frame of intelligence illustrated in FIG. 2. The station address data indicates the anticipated respondent in the next network transmission. Provision for this a priori knowledge is accounted for in the software programming of the network computers as is well known.

In accordance with the present invention a typical receiver, e.g. the receiver at station A in FIG. 4 utilizes this a priori knowledge of the anticipated respondent to select an estimated gain to be required in the station A receiver for receiving the anticipated message from station B. Referring now to FIG. 1 there is illustrated the preferred embodiment 10 of the present invention, one network station only being illustrated therein since all stations in the network would preferably be substantially identical. The station 10 illustrated in FIG. 1 is comprised of a station computer and memory 12 which receives its input from the station receiver 14 via antenna 16. Typically the receiver 14 includes an RF section, a mixer section, an IF section, a detector section, an audio frequency section and an AGC control circuit associated with an AGC bus connected for controlling the gain of the receiver 14 as is well known. In accordance with the present teachings, the station 10 also includes a digital-to-analog (D/A) converter 18 having its input connected to the station computer 12 and its output connected to the AGC bus of the receiver 14. The station 10 also comprises an analog-to-digital (A/D) converter 20 having its input connected to the AGC bus of receiver 14 and its output connected to the station computer and memory 12. D/A converter 18 functions to receive an output from the computer 12 that is indicative of the previously recorded level of gain required for reception of the transmission from the next station to transmit. This computer 12 output is converted by the D/A converter 18 to a D.C. output that is injected onto the AGC bus of receiver 14. A/D converter 20 functions to convert the analog output on the AGC bus of receiver 14 to a digital input to computer 12. This digital input to computer 12 thus comprises the AGC level that was set during signal reception by receiver 14. Computer 12 thereby stores the value of the AGC voltage best estimated for receiving signals from the sending transmitter.

Referring now to FIG. 3 there is illustrated the computer program flow-chart describing the modifications taught by the present invention for incorporation into a computer-to-computer communications network such as the aforementioned Navy Link-14. The program is denoted a sub-routine because it is intended to be incorporated into any prior art system that includes software programming for determining which station in the network is going to transmit next. With that in mind the first step in accomplishing the present invention is the determination of which station is next to transmit. This information, may, for example, be available from the data included in the station address portion of the data frame illustrated in FIG. 2 as is well known. Other data formats, of course, could be utilized. If that station has previously transmitted a gain level will have already been recorded in the computer memory 12 via the A/D converter 20 on information from the previous transmissions. If the transmitting station is a new station and has, therefore, not previously transmitted, the memory 12 will automatically recognize that fact and will utilize a pre-programmed arbitrary value to set the receiver 14 gain to a maximum level. It is believed that setting the receiver gain to the maximum level in this situation is the best mode of operation since setting the receiver at the maximum gain will help to insure that a weak signal is not lost. It is to be understood, however, that this setting of gain to a maximum level is an arbitrary decision and depending on the particular system requirements there may be a more judicious choice. The gain level stored in memory 12 is next utilized as the input to the D/A converter 18 which responds thereto by injecting a D.C. voltage onto the AGC bus of receiver 14. After waiting a predetermined period of time sufficient to permit the AGC circuit to stabilize in response to the signal being received, the output of the A/D converter 20 represents the new level of gain required for reception of signals from the relevant transmitter and this new level is now stored in the computer memory 12 as an updated gain value. This updated gain value is now, of course, available for reception of the next transmission from the relevant transmitter.

It is thus readily apparent that instead of using five AGC frames and three intelligence frames as is illustrated in FIG. 2 and is presently the practice in Link-14, one AGC frame is sufficient by using the present invention. The resultant increase in data throughput is also readily apparent. In accordance with the present teachings other parameters, such as doppler shift, can also be continuously set to the best estimated values in the same manner as hereinbefore described thus further simplifying an improving system performance during the early portions of the messages. It is also to be understood that notwithstanding the fact that the illustrated embodiments utilize the existing computer memory and processing capabilities, a separate memory and separate processor could be utilized if desired.

Obviously many modifications and variations of the present invention are possible in the light of the above teachings. It is therefore to be understood that within the scope of the appended claims the invention may be practiced otherwise than as specifically described.

What is claimed is:

1. In a computer-to-computer data transmission system including a first location transmitter and receiver operably coupled to a computer at said first location and further including at least one other remote location transmitter and receiver operably coupled to a computer at said remote location wherein said first location transmitter and receiver communicate directly with each said remote receiver and transmitter, respectively, wherein each receiver in said system may receive a present transmission and a preceding transmission occurring before said present transmission, and wherein the amplitude of the signals received by each said receiver is dependent upon which of said transmitters is transmitting, said first location receiver including an automatic gain control circuit, the improvement comprising:

first means operably coupled from said first location automatic gain control circuit and to said first location computer for providing said first location computer with signals representative of sampled values of the amplitude of signals received by said first location receiver during said preceding transmission from each said remote transmitter in said system; and second means operably coupled to said first location automatic gain control circuit and to said first location computer, and responsive to said first location computer for providing said first location automatic gain control circuit with signals representative of said sampled amplitude values for setting a distinct gain level in said first location automatic gain control circuit for each said remote transmitter in said system.

2. The system of claim 1 wherein said first means comprises an A/D converter.

3. The system of claim 1 wherein said second means comprises a D/A converter.

4. The system of claim 2 wherein said second means comprises a D/A converter.

5. In a computer-to-computer data transmission system including a first location transmitter and receiver operably coupled to a computer at said first location, said computer having a memory associated therewith, and further including at least one other remote location transmitter and receiver operably coupled to a computer at said remote location, said first location receiver including an automatic gain control circuit, the method of controlling the gain of said first location receiver comprising the steps of:
  (a) storing in said memory at said first location for each said remote transmitter data indicative of the gain required for reception by said first location receiver of a signal from each said remote transmitter; and
  (b) prior to each transmission from any said remote transmitter, adjusting the gain of said automatic gain control circuit to the level indicated by said stored data.

6. The system of claim 1 wherein said at least one other remote location transmitter and receiver comprises at least two remote transmitters and receivers.

7. The system of claim 1 wherein said first means consists of an analog-to-digital converter.

8. The system of claim 7 wherein said second means consists of a digital-to-analog converter.

9. The system of claim 7 wherein said first location automatic gain control circuit includes an automatic gain control circuit bus; and
  said first and second means are connected directly to said bus.

10. The method of claim 5 wherein said at least one other remote location transmitter and receiver comprises at least two remote transmitters and receivers.

* * * * *